US011286997B2

(12) United States Patent
Konishi et al.

(10) Patent No.: US 11,286,997 B2
(45) Date of Patent: Mar. 29, 2022

(54) POWER TRANSMISSION DEVICE

(71) Applicant: DENSO CORPORATION, Kariya (JP)

(72) Inventors: Toshihiro Konishi, Kariya (JP);
Shigeyoshi Sakuraba, Kariya (JP);
Takayuki Hirose, Kariya (JP);
Toshihiro Hayashi, Kariya (JP);
Kazuma Tachibana, Kariya (JP);
Hiroki Nagahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 16/581,880

(22) Filed: Sep. 25, 2019

(65) Prior Publication Data
US 2020/0018362 A1 Jan. 16, 2020

Related U.S. Application Data

(63) Continuation of application No. PCT/JP2018/027160, filed on Jul. 19, 2018.

(30) Foreign Application Priority Data

Jul. 28, 2017 (JP) .............................. JP2017-146344

(51) Int. Cl.
*F16D 27/112* (2006.01)
*F16D 27/14* (2006.01)
*F16D 27/00* (2006.01)

(52) U.S. Cl.
CPC ............ *F16D 27/112* (2013.01); *F16D 27/14* (2013.01); *F16D 2027/007* (2013.01)

(58) Field of Classification Search
CPC .................................................. F16D 27/112
See application file for complete search history.

(56) References Cited

U.S. PATENT DOCUMENTS 3,044,594 A * 7/1962 Bernard ............... F16D 27/112
192/84.7
3,307,669 A * 3/1967 Klinkenberg ......... F16D 27/112
192/84.96
(Continued)

FOREIGN PATENT DOCUMENTS

JP S62-233529 A 10/1987
JP 2013-245573 A 12/2013
(Continued)

OTHER PUBLICATIONS

U.S. Appl. No. 16/545,528, filed Aug. 20, 2019, Konishi et al.

*Primary Examiner* — Stacey A Fluhart
(74) *Attorney, Agent, or Firm* — Posz Law Group, PLC

(57) ABSTRACT

An armature includes an inner plate located on an inner side of a groove and an outer plate located on an outer side of the groove. The hub includes: an outer hub; an inner hub that is coupled to a shaft; and a primary elastic member that is interposed between the inner hub and the outer hub and is configured to exert an elastic force to the outer hub in a direction away from a rotor. The outer hub includes an outer side coupling portion that is opposed to the outer plate and the inner plate and is coupled to the outer plate. The hub includes a secondary elastic member that is clamped between: the outer plate and the inner plate located on one side of the secondary elastic member; and the outer side coupling portion located on another side of the secondary elastic member.

10 Claims, 11 Drawing Sheets

(56) References Cited

U.S. PATENT DOCUMENTS

| | | | | |
|---|---|---|---|---|
| 4,793,455 | A | * | 12/1988 | Tabuchi .................... F16D 3/68 |
| | | | | 192/200 |
| 5,250,921 | A | * | 10/1993 | Van Laningham ... F16D 27/112 |
| | | | | 335/296 |
| 5,632,366 | A | * | 5/1997 | Mullaney ............ F04B 27/0895 |
| | | | | 192/209 |
| 6,209,699 | B1 | * | 4/2001 | Hayashi ................ F16D 27/112 |
| | | | | 192/200 |
| 7,213,695 | B2 | * | 5/2007 | Konishi ................ F16D 27/112 |
| | | | | 192/84.941 |
| 2005/0139446 | A1 | | 6/2005 | Imai et al. |
| 2008/0067028 | A1 | * | 3/2008 | Nagaya ................ F16D 27/112 |
| | | | | 192/84.941 |
| 2011/0127136 | A1 | | 6/2011 | Sakuraba et al. |
| 2016/0040728 | A1 | * | 2/2016 | Sakamoto ............ F16D 27/112 |
| | | | | 192/84.96 |
| 2019/0072136 | A1 | * | 3/2019 | Nakamura .............. F16D 27/14 |

FOREIGN PATENT DOCUMENTS

| | | | | |
|---|---|---|---|---|
| JP | 2013245573 A | * | 12/2013 | |
| JP | 2014-149045 A | | 8/2014 | |
| JP | 2015-169233 A | | 9/2015 | |
| JP | 2018-080827 A | | 5/2018 | |
| WO | WO-2015133085 A1 | * | 9/2015 | ............ F16D 27/06 |
| WO | 2018/088234 A1 | | 5/2018 | |

* cited by examiner

POWER TRANSMISSION DEVICE

CROSS REFERENCE TO RELATED APPLICATIONS

This application is a continuation application of International Patent Application No. PCT/JP2018/027160 filed on Jul. 19, 2018, which designated the U.S. and claims the benefit of priority from Japanese Patent Application No. 2017-146344 filed on Jul. 28, 2017. The entire disclosures of all of the above applications are incorporated herein by reference.

TECHNICAL FIELD

The present disclosure relates to a power transmission device.

BACKGROUND

There is a power transmission device configured to transmit a rotational drive force, which is outputted from a drive source, to a drive-subject device. For instance, an electromagnetic clutch, which serves as the power transmission device, includes an electromagnetic coil, a rotor, an armature and a flat spring member. The electromagnetic coil is installed at a housing. The rotor is rotatably supported by the housing. The armature is magnetically attracted to and is coupled to the rotor by a magnetic force generated at a time of energizing the electromagnetic coil. The flat spring member exerts a resilient force to the armature in a direction away from the rotor.

SUMMARY

This section provides a general summary of the disclosure, and is not a comprehensive disclosure of its full scope or all of its features.

According to the present disclosure, there is provided a power transmission device configured to transmit a rotational drive force, which is outputted from a drive source, to a drive-subject device. The power transmission device includes an electromagnet, a rotor, an armature and a hub. The electromagnet is configured to generate a magnetic attractive force when the electromagnet is energized. The rotor is configured to be rotated about a rotational axis by the rotational drive force. The armature is configured to be coupled to and is rotated together with the rotor when the electromagnet is energized. The armature is configured to be decoupled from the rotor when the electromagnet is deenergized. The hub couples the armature to a shaft of the drive-subject device.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
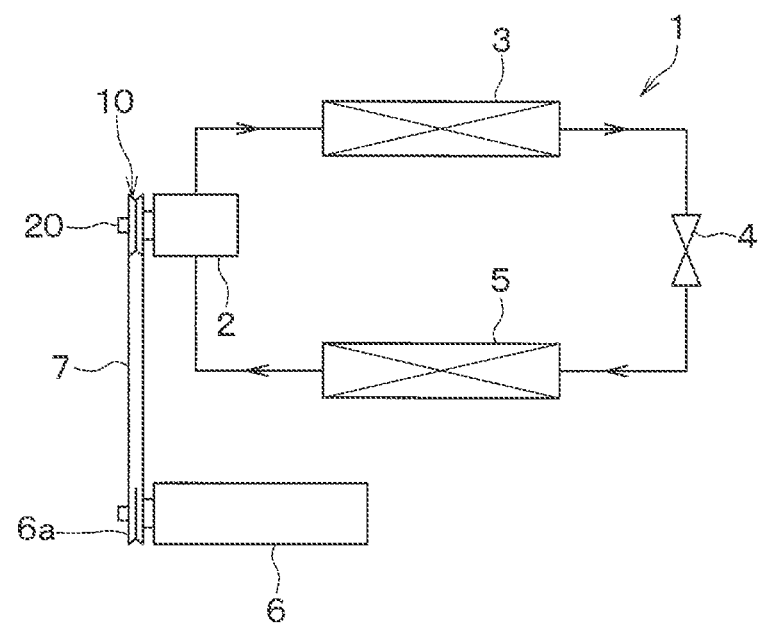
FIG. 1 is an overall layout diagram of a refrigeration cycle, to which a power transmission device of a first embodiment is applied.

As a power transmission device, there has been proposed an electromagnetic clutch. The electromagnetic clutch includes: an electromagnetic coil that is installed at a housing; a rotor that is rotatably supported by the housing; an armature that is magnetically attracted to and is coupled to the rotor by a magnetic force generated at a time of energizing the electromagnetic coil; and a flat spring member that exerts a resilient force to the armature in a direction away from the rotor.

In this electromagnetic clutch, a contact noise is generated when the armature is magnetically attracted to and contacts the rotor through the energization of the electromagnetic coil. Furthermore, in this electromagnetic clutch, since the armature is magnetically attracted to and is coupled to the rotor in the state where the armature is rotated together with the rotor, a resonance noise is generated by vibrations (serving as a vibration source) induced by slipping of the armature relative to the rotor. When these noises become loud, these noises are very annoying to an occupant of a vehicle. There is an electromagnetic clutch that uses a rubber member named a coupling rubber to reduce these noises.

This electromagnetic clutch includes: an inner hub that is installed to a rotatable shaft inserted through a radially inner portion of the housing; an armature that is shaped in a circular disk form and is magnetically attracted to and is coupled to a rotor by a magnetic force generated at a time of energizing an electromagnetic coil; an outer hub that is coupled to the armature; and a rubber member that exerts an elastic force to the outer hub in a direction away from the rotor.

In this electromagnetic clutch, grooves, which extend in a circumferential direction, are formed at the armature. Specifically, the armature includes an inner plate, which is located on an inner side of the grooves, and an outer plate, which is located on an outer side of the grooves. The outer plate is coupled to the outer hub.

In this electromagnetic clutch, when the electromagnetic coil is energized, the armature is magnetically attracted to and is coupled to the rotor by the magnetic attractive force generated by the electromagnetic coil, so that the rubber member is elastically deformed, and the armature is coupled to the rotor.

When the electromagnetic coil is deenergized, the armature is pulled away from the rotor by the elastic force of the rubber member. At this time, since the armature is received by the rubber member, generation of the operational noise is suppressed.

According to a study of the inventors of the present application, in the above electromagnetic clutch, at the time of starting the energization of the electromagnetic coil, the outer plate contacts the armature, and thereby generation of vibrations is suppressed. However, in this electromagnetic clutch, a contact surface area between the rubber member and the inner plate is relatively small, so that the noise, which is generated by collision of the inner plate against the rotor, cannot be sufficiently limited.

According to one aspect of the present disclosure, there is provided a power transmission device configured to transmit a rotational drive force, which is outputted from a drive source, to a drive-subject device. The power transmission device includes: an electromagnet that is configured to generate a magnetic attractive force when the electromagnet is energized; a rotor that is configured to be rotated about a rotational axis by the rotational drive force; an armature that is configured to be coupled to and is rotated together with the rotor when the electromagnet is energized, wherein the armature is configured to be decoupled from the rotor when the electromagnet is deenergized; and a hub that couples the armature to a shaft of the drive-subject device. The armature has a groove that extends in a circumferential direction about the rotational axis, and the armature includes an inner plate, which is located on an inner side of the groove, and an outer plate, which is located on an outer side of the groove. The hub includes: an outer hub; an inner hub that is coupled to the shaft; and a primary elastic member that is interposed between the inner hub and the outer hub and is configured to exert an elastic force to the outer hub in a direction away from the rotor. The outer hub includes an outer side coupling portion that is opposed to the outer plate and the inner plate and is coupled to the outer plate. The hub includes a secondary elastic member that is clamped between: the outer plate and the inner plate located on one side of the secondary elastic member; and the outer side coupling portion located on another side of the secondary elastic member.

With the above configuration, the outer hub includes the outer side coupling portion that is opposed to the outer plate and the inner plate and is coupled to the outer plate. The hub includes the secondary elastic member, which is clamped between: the outer plate and the inner plate located on the one side of the secondary elastic member; and the outer side coupling portion located on the other side of the secondary elastic member. Thus, when the electromagnet is energized, the vibration of the outer plate and the inner plate is suppressed by the secondary elastic member that is clamped between: the outer plate and the inner plate located on the one side of the secondary elastic member; and the outer side coupling portion located on the other side of the secondary elastic member. Thus, the operational noise, which is generated at the time of energizing the electromagnet, can be limited.

Hereinafter, embodiments of the present disclosure will be described. In the following embodiments, parts, which are the same as or equivalent to the parts described in the preceding embodiments, may be given the same reference signs, and descriptions thereof may be omitted. In addition, when only some of the components are described in the embodiment, the components described in the preceding embodiment may be applied to the other components. The following embodiments may be partially combined with each other even if they are not particularly specified as long as there is no problem in particular in the combination.

First Embodiment

In a vehicle air conditioning apparatus for conditioning the air in a vehicle cabin, the refrigeration cycle 1 functions as an apparatus for adjusting the temperature of the air blown into the vehicle cabin. The refrigeration cycle 1 includes: a compressor 2 that compresses and discharges refrigerant; a radiator 3 that radiates heat from the refrigerant discharged from the compressor 2; an expansion valve 4 that depressurizes the refrigerant outputted from the radiator 3; and an evaporator 5 that evaporates the refrigerant depressurized through the expansion valve 4. The compressor 2, the radiator 3, the expansion valve 4 and the evaporator 5 are connected one after the other like a loop to form a closed circuit.

A rotational drive force, which is outputted from an engine 6, is transmitted to the compressor 2 through the power transmission device 10. In the present embodiment, the engine 6 serves as a drive source, which outputs the rotational drive force, and the compressor 2 serves as a drive-subject device.

For instance, a swash plate type variable displacement compressor may be used as the compressor 2. Another type of variable displacement compressor or a fixed displacement compressor (e.g., a scroll type fixed displacement compressor or a vane type fixed displacement compressor) may be used as the compressor 2 as long as such a compressor can compress and discharge the refrigerant of the refrigeration cycle 1 upon transmission of the rotational drive force to the compressor 2.

In the compressor 2 of the present embodiment, one end side of the shaft 20 is exposed to an outside of a housing (not shown). The power transmission device 10 is installed to an exposed portion of the shaft 20, which is exposed to the outside of the housing. A seal member (e.g., a lip seal) is installed to the shaft 20 to limit leakage of the refrigerant from an inside of the housing to the outside through a gap between the shaft 20 and the housing while the housing forms an outer shell of the compressor 2. A material, a shape and the like of the seal member are optimized to implement high sealing performance between the shaft 20 and the housing.

Next, the power transmission device 10 is a device that enables and disables transmission of the rotational drive force of the engine 6, which serves as a drive source for driving the vehicle, to the compressor 2, which is the drive-subject device. The power transmission device 10 is connected to a rotation output portion 6a of the engine 6 through a belt 7.

Figure 2:
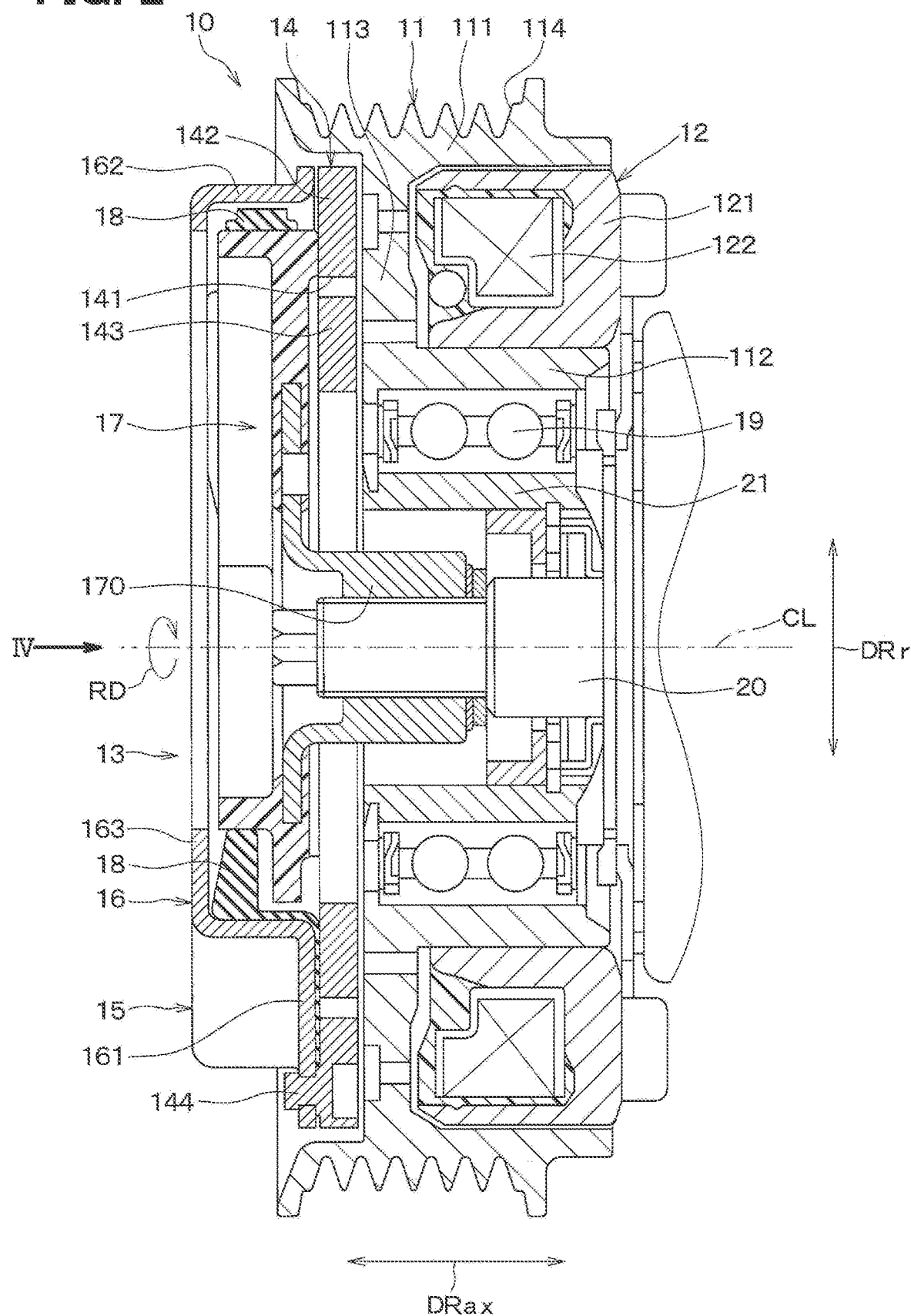
FIG. 2 is a schematic cross-sectional view showing an overall structure of the power transmission device of the first embodiment.

FIG. 2 is a cross-sectional view of the power transmission device 10, which is taken along an axial direction of the shaft 20 of the compressor 2. A reference sign DRax shown in FIG. 2 indicates the axial direction of the shaft 20 that extends along a central axis CL of the shaft 20. Furthermore, a reference sign DRr shown in FIG. 2 indicates a radial direction of the shaft 20 that is perpendicular to the axial direction DRax. These descriptions about the reference signs DRax, DRr are also equally applicable to the other drawings, which are other than FIG. 2.

Figure 3:
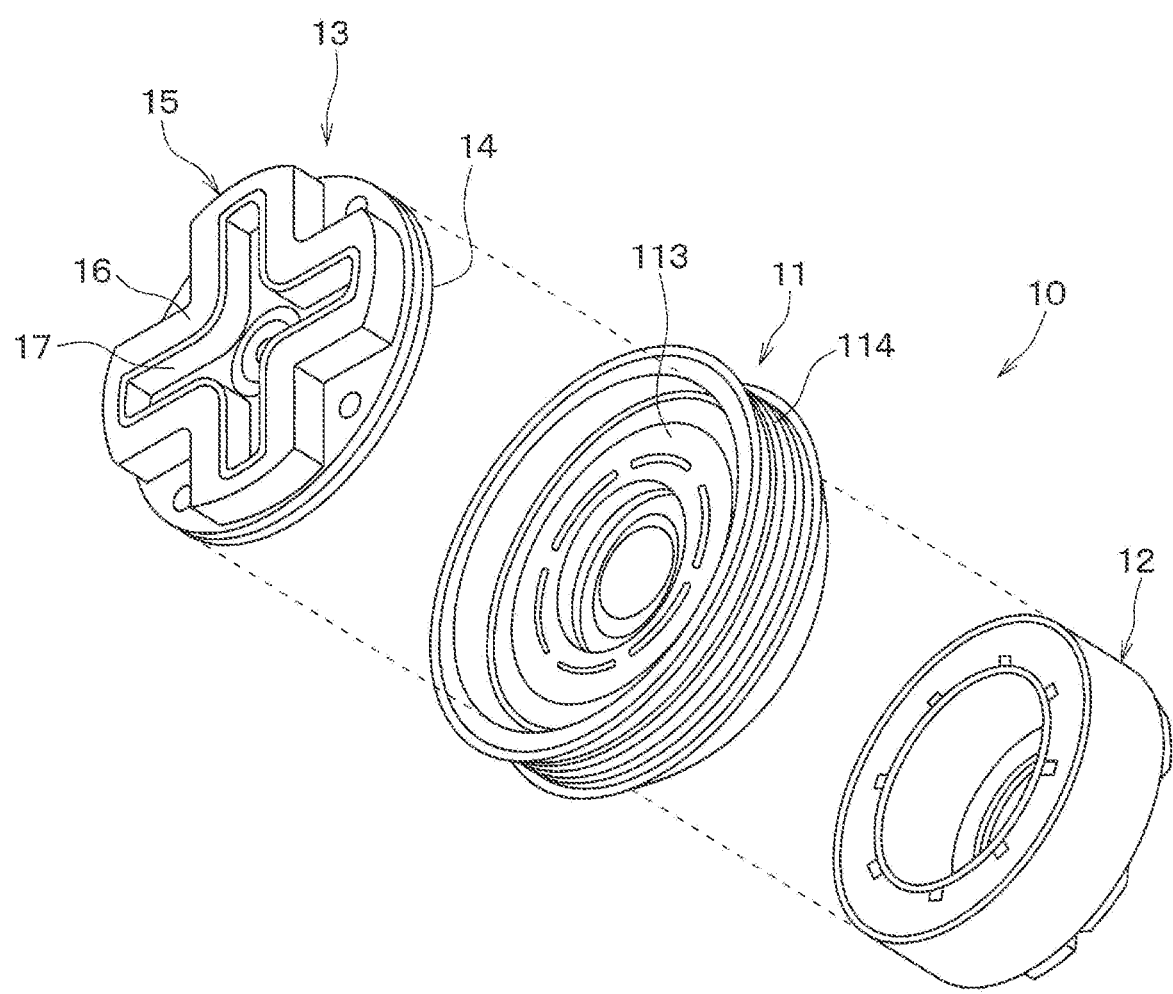
FIG. 3 is a schematic perspective exploded view of the power transmission device of the first embodiment.

As shown in FIGS. 2 and 3, the power transmission device 10 includes: a rotor 11; a driven-side rotatable body 13 that is configured to be rotated integrally with the shaft 20 of the compressor 2 when the driven-side rotatable body 13 is coupled to the rotor 11; and an electromagnet 12 that is configured to generate a magnetic attractive force for coupling between the driven-side rotatable body 13 and the rotor 11.

The rotor 11 serves as a driving-side rotatable body that is rotated by the rotational drive force outputted from the engine 6. As shown in FIG. 2, the rotor 11 of the present embodiment includes an outer cylindrical tubular portion 111, an inner cylindrical tubular portion 112 and an end surface portion 113.

The outer cylindrical tubular portion 111 is shaped in a cylindrical tubular form and is coaxial with the shaft 20. The inner cylindrical tubular portion 112 is shaped into a cylindrical tubular form and is placed on a radially inner side of the outer cylindrical tubular portion 111 while the inner cylindrical tubular portion 112 is coaxial with the shaft 20.

The end surface portion 113 is a connecting portion that connects between one end of the outer cylindrical tubular portion 111 and one end of the inner cylindrical tubular portion 112, which are located on one end side in the axial direction DRax. The end surface portion 113 is shaped in a circular disk form. Specifically, the end surface portion 113 extends in the radial direction DRr of the shaft 20 and has a through hole that has a circular cross section and extends through a center of the end surface portion 113.

A longitudinal cross section of the rotor 11 of the present embodiment taken along the axial direction DRax of the shaft 20 is shaped in a C-shape form. An annular space is formed between the outer cylindrical tubular portion 111 and the inner cylindrical tubular portion 112 while the end surface portion 113 forms a bottom surface portion of the annular space.

The space, which is formed between the outer cylindrical tubular portion 111 and the inner cylindrical tubular portion 112, is coaxial with the shaft 20. The electromagnet 12 is placed in this space that is formed between the outer cylindrical tubular portion 111 and the inner cylindrical tubular portion 112.

The electromagnet 12 includes a stator 121 and a coil 122 while the coil 122 is placed at an inside of the stator 121. The stator 121 is shaped into a ring form and is made of a ferromagnetic material (e.g., iron). The coil 122 is fixed to the stator 121 in a state where the coil 122 is resin molded with a dielectric resin material, such as epoxy resin. The electromagnet 12 is energized by a control voltage that is outputted from a control device (not shown).

The outer cylindrical tubular portion 111, the inner cylindrical tubular portion 112 and the end surface portion 113 are formed integrally in one piece from a ferromagnetic material (e.g., iron). The outer cylindrical tubular portion 111, the inner cylindrical tubular portion 112 and the end surface portion 113 form a portion of a magnetic circuit that is formed through the energization of the electromagnet 12.

An outer peripheral part of the outer cylindrical tubular portion 111 includes a V-groove portion 114 that has a plurality of V-grooves. The belt 7 is wound around the V-groove portion 114 to transmit the rotational drive force outputted from the engine 6.

An outer peripheral part of a ball bearing 19 is fixed to an inner peripheral part of the inner cylindrical tubular portion 112. A boss portion 21, which is shaped in a cylindrical tubular form and projects from the housing (serving as an outer shell of the compressor 2) toward the power transmission device 10, is fixed to an inner peripheral part of the ball bearing 19. In this way, the rotor 11 is rotatably fixed to the housing of the compressor 2. The boss portion 21 covers a base portion of the shaft 20, which is exposed to the outside of the housing.

An outside surface of the end surface portion 113, which is placed on the one end side in the axial direction DRax, forms a friction surface that contacts an armature 14 of the driven-side rotatable body 13, which will be described later, when the rotor 11 is coupled to the armature 14.

In the present embodiment, although not shown, a friction member, which is configured to increase a friction coefficient of the end surface portion 113, is formed at a portion of a surface of the end surface portion 113. This friction member is made of a non-magnetic material. The friction member may be made of a material formed by mixing alumina into resin and solidifying the same or may be made of a sinter of metal powder such as aluminum powder.

The driven-side rotatable body 13 includes the armature 14 and a hub 15. The armature 14 is a plate member shaped into a circular ring form. The armature 14 extends in the radial direction DRr and has a through hole that penetrates through the armature 14 at a center of the armature 14. The armature 14 is made of a ferromagnetic material (e.g., iron). The armature 14 cooperates with the rotor 11 to form a portion of the magnetic circuit that is formed when the electromagnet 12 is energized.

The armature 14 is opposed to the end surface portion 113 while a predetermined minute gap (e.g., about 0.5 mm) is interposed between the armature 14 and the end surface portion 113 of the rotor 11. A planar portion of the armature 14, which is opposed to the end surface portion 113 of the rotor 11, forms a friction surface that is configured to contact the end surface portion 113 when the rotor 11 and the armature 14 are coupled with each other.

Furthermore, the armature 14 of the present embodiment includes a plurality of grooves 141 that are formed to shield magnetism at an intermediate portion of the armature 14, which is placed in the middle of the armature 14 in the radial direction DRr. Each of the grooves 141 is shaped in an arcuate form that extends in the circumferential direction of the armature 14, and the plurality of grooves 141 is formed at the armature 14. The armature 14 of the present embodiment is divided into an outer plate 142, which is located on the outer side of the grooves 141, and an inner plate 143, which is located on the inner side of the grooves 141. The outer plate 142 of the armature 14 is joined to the hub 15 by fastening members 144, such as rivets. The fastening members 144 are respectively formed by a metal member made of, for example, aluminum.

The hub 15 forms a fastening member that fastens the armature 14 to the shaft 20 of the compressor 2. In other words, the armature 14 and the shaft 20 are coupled with each other through the hub 15.

Figure 4:
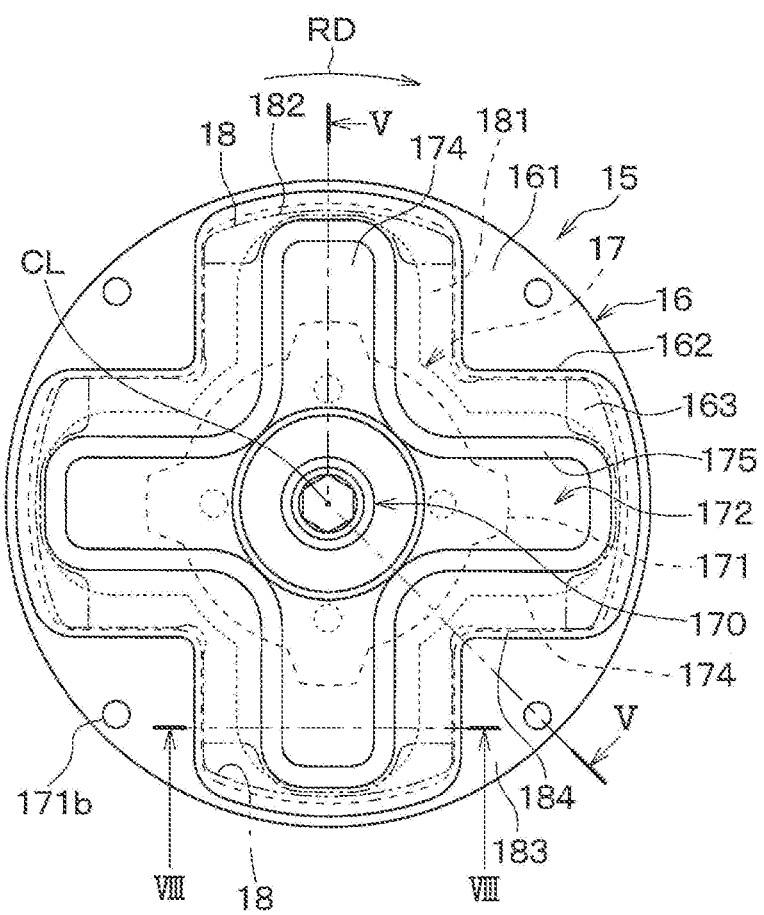
FIG. 4 is a diagram taken in a direction of an arrow IV in FIG. 2, showing a hub of the power transmission device.
Figure 5:
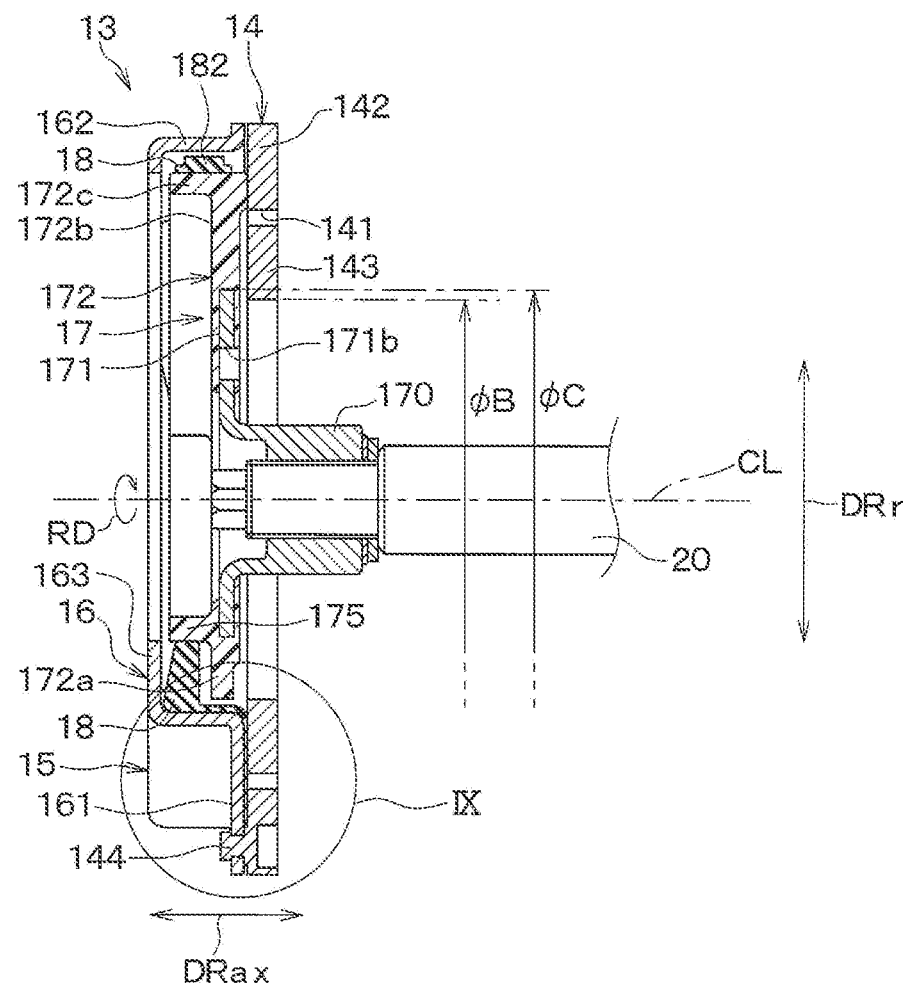
FIG. 5 is a cross-sectional view taken along line V-V in FIG. 4.

As shown in FIGS. 4 and 5, the hub 15 of the present embodiment includes an outer hub 16, an inner hub 17 and a rubber member 18. A dot-dot-dash line shown in FIG. 4 indicates an outer peripheral edge of the rubber member 18.

Figure 7:
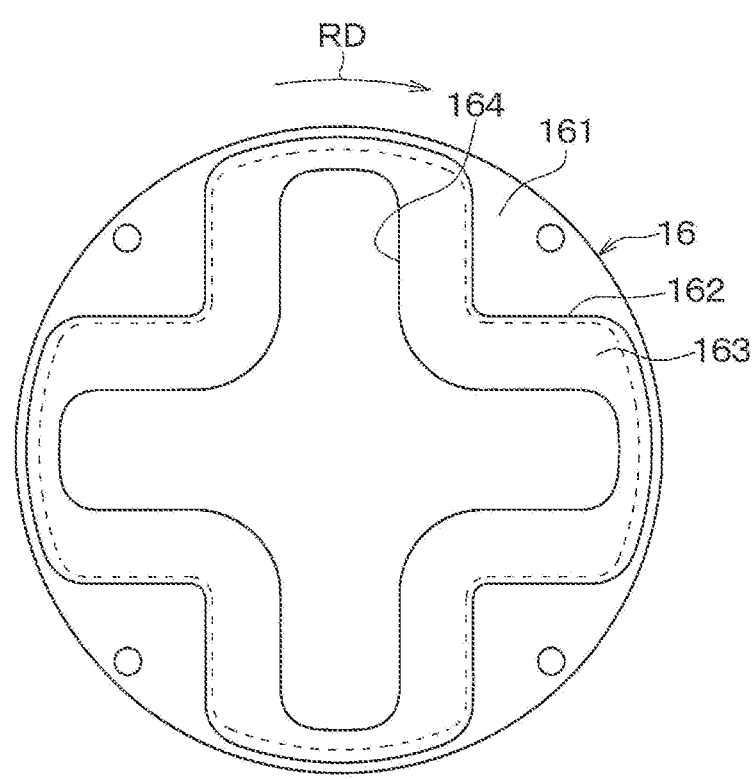
FIG. 7 is a schematic front view of an outer hub.
Figure 8:
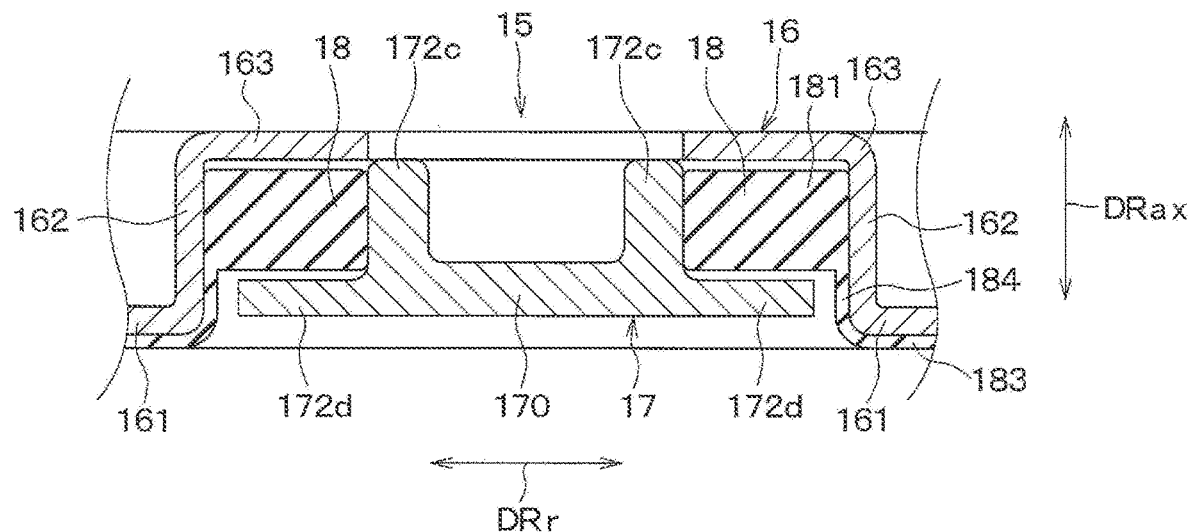
FIG. 8 is a cross-sectional view taken along line VIII-VIII in FIG. 4.
Figure 9:
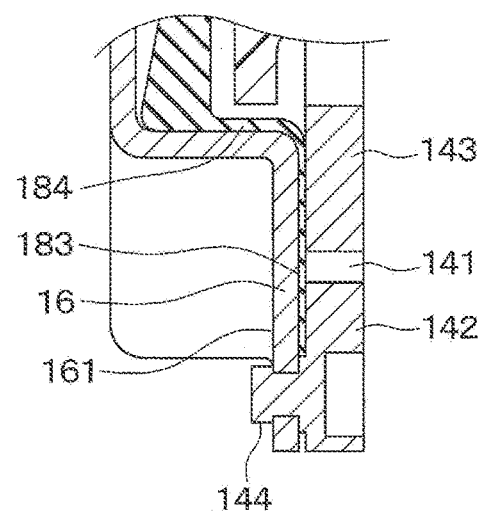
FIG. 9 is an enlarged view of an area IX in FIG. 5.

As shown in FIG. 2, the outer hub 16 is coupled to the outer plate 142 of the armature 14 by the fastening members 144. As shown in FIGS. 5 and 7, the outer hub 16 includes: an outer side coupling portion 161 that is shaped in a plate form and is coupled to the armature 14; an outer side flange portion 162 that extends from an inner peripheral part of the outer side coupling portion 161 in the axial direction DRax of the shaft 20; and an outer side receiving portion 163. The outer hub 16 of the present embodiment is constructed such that the outer side coupling portion 161, the outer side flange portion 162 and the outer side receiving portion 163 are formed together in one piece. The outer hub 16 of the present embodiment is formed by a metal member that is made of, for example, aluminum.

The outer side coupling portion 161 is shaped in a circular form that has a diameter, which is substantially the same as that of the armature 14. The outer side coupling portion 161 has an opening while the opening is shaped in a crisscross shape (i.e., a shape in a symbol of +) and is located at an inside of a part of the outer side coupling portion 161, which is coupled to the armature 14.

The outer side flange portion 162 extends from the inner peripheral part of the outer side coupling portion 161 in a direction away from the armature 14. The outer side flange portion 162 is shaped such that the outer side flange portion 162 surrounds the inner hub 17, which will be described later, in a rotational direction RD of the shaft 20.

Specifically, the outer side flange portion 162 is formed by a tubular portion that is shaped in a crisscross shape (i.e., a shape in a symbol of +), which corresponds to an outer shape of the inner hub 17. A predetermined gap is formed between the inner peripheral part of the outer side flange portion 162 and the outer peripheral part of the inner hub 17. In the present embodiment, the outer side flange portion 162 forms an inner peripheral wall part that surrounds a flange portion 172c of the inner hub 17, which will be described later, in the rotational direction RD of the shaft 20.

The shape of the outer side flange portion 162 and the shape of the opening formed at the outer side coupling portion 161 are not necessarily limited to the crisscross shape and may be, for example, a radiating shape (e.g., a Y-shape) or a polygonal shape.

The outer side receiving portion 163 extends from the outer side flange portion 162 toward the axis CL of the shaft 20 such that the outer side receiving portion 163 is opposed to opposite parts of a plurality of projecting portions 172b of the inner hub 17, which are opposite to the armature 14, in the axial direction DRax of the shaft 20. An opening 164, which is shaped in a crisscross shape (i.e., a shape in a symbol of +), is formed at the center of the outer side receiving portion 163.

Figure 6:
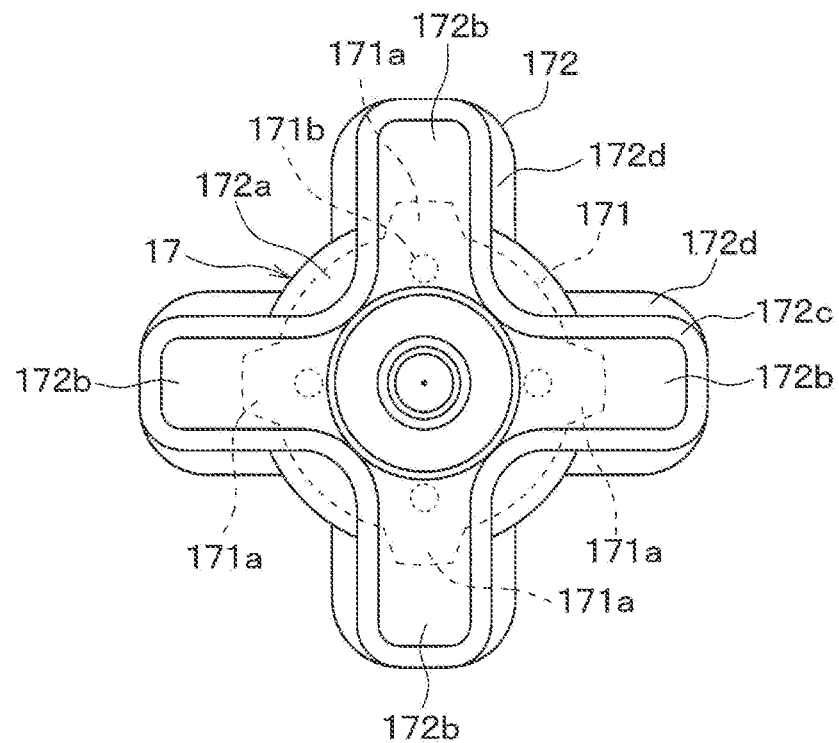
FIG. 6 is a schematic front view of an inner hub.

Next, as shown in FIG. 5, the inner hub 17 is coupled to the shaft 20 of the compressor 2. As shown in FIGS. 5 and 6, the inner hub 17 includes a boss portion 170, an inner side plate-shaped portion 171 and an inner plate 172 while the boss portion 170 is coupled to the shaft 20. The boss portion 170 and the inner side plate-shaped portion 171 are formed integrally in one piece as a metal member that is made of, for example, iron. A part of the inner side plate-shaped portion 171 is embedded in the inner plate 172 by insert molding, so that the inner side plate-shaped portion 171 and the inner plate 172 are integrated together.

The boss portion 170 is formed by a tubular portion. A female thread, which is configured to be engaged with a male thread formed at an outer peripheral part of the shaft 20, is formed at an inner peripheral part of the boss portion 170. The inner hub 17 is coupled to the shaft 20 through the engagement between the female thread, which is formed at the boss portion 170, and the male thread of the shaft 20.

The inner side plate-shaped portion 171 is a member that extends from a surface of the boss portion 170, which is opposite from the compressor 2, in the radial direction DRr of the shaft 20. The inner side plate-shaped portion 171 includes four projections 171a, which outwardly project in the radial direction DRr of the shaft 20. Furthermore, four molding holes 171b are formed at the inner side plate-shaped portion 171.

The inner plate 172 is placed between the outer hub 16 and the inner side plate-shaped portion 171. The inner plate 172 couples between the outer hub 16 and the inner side plate-shaped portion 171. The inner plate 172 includes a main body portion 172a, the projecting portions 172b, the flange portion 172c and receiving portions 172d. The main body portion 172a, the projecting portions 172b, the flange portion 172c and the receiving portions 172d are molded in one piece from resin. The inner plate 172 of the present embodiment is made of the resin having a melting point of about 180 to 300 degrees Celsius. Specifically, the inner plate 172 may be made of PBT (polybutylene terephthalate), PO (polyolefin), nylon 66, PPS (polyphenylene sulfide) or the like.

The main body portion 172a is shaped in a circular disk form and extends in the radial direction DRr of the shaft 20. The four projecting portions 172b are formed at the outer peripheral part of the main body portion 172a and outwardly project in the radial direction DRr of the shaft 20.

The flange portion 172c projects from outer peripheral parts of the projecting portions 172b in a direction away from the armature 14. The flange portion 172c projects in the axial direction DRax of the shaft 20 such that the flange portion 172c is opposed to the outer side flange portion 162.

Specifically, the flange portion 172c is formed by a tubular portion that is shaped in a crisscross shape (i.e., a shape in a symbol of +). A predetermined gap is formed between the outer peripheral part of the flange portion 172c and the inner peripheral part of the outer hub 16.

The receiving portions 172d are formed to limit movement of the rubber member 18 in the axial direction DRax of the shaft 20. The receiving portions 172d outwardly extend in the radial direction DRr of the shaft 20 from outer peripheral parts of the projecting portions 172b.

The rubber member 18 holds the outer hub 16 with an elastic force thereof such that the outer hub 16 is movable relative to the inner hub 17 in the axial direction DRax of the shaft 20, and the rubber member 18 cushions and transmits the rotational force of the outer hub 16 to the inner hub 17.

An urging force is applied from the rubber member 18 to the armature 14 in a direction away from the rotor 11. When the magnetic attractive force is not generated in a deenergized state of the electromagnet 12, a gap is generated between the planar portion of the armature 14 and the end surface portion 113 of the rotor 11 by the urging force of the rubber member 18.

As shown in FIGS. 5 and 8 to 12, the rubber member 18 of the present embodiment includes a damper portion 181 having a thick wall, a plurality of peripheral portions 182, a plurality of vibration suppressor portions 183 having a thin wall, and a plurality of connecting portions 184. The damper portion 181, the peripheral portions 182, the vibration suppressor portions 183 and the connecting portions 184 are formed integrally in one piece. The damper portion 181 serves as a primary elastic member, and each of the vibration suppressor portions 183 serves as a secondary elastic member.

Figure 10:
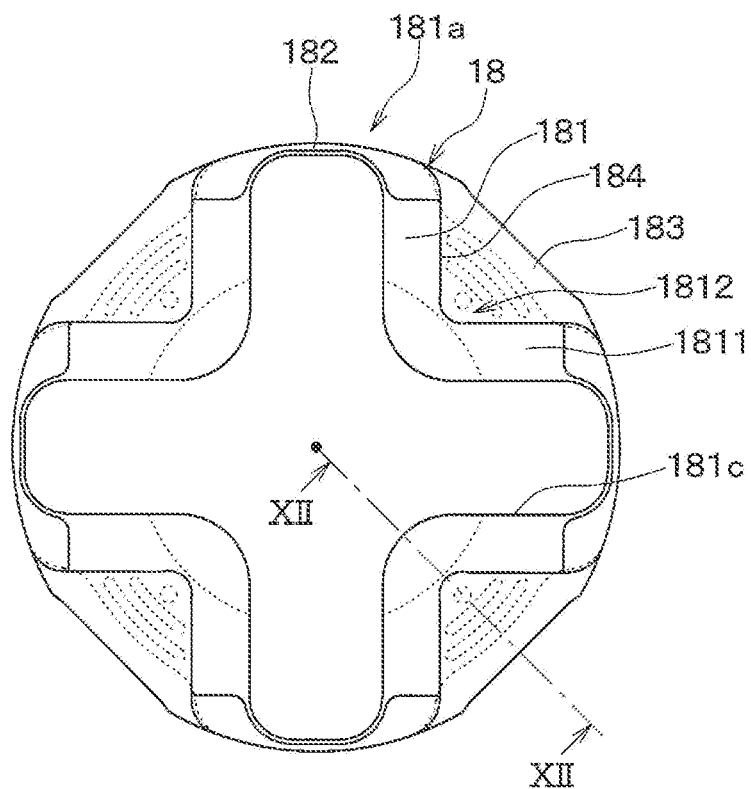
FIG. 10 is a schematic front view of a rubber member.

As shown in FIG. 10, the damper portion 181 is formed by a tubular portion that is shaped in a crisscross shape (i.e., a shape in a symbol of +), which corresponds to an outer shape of the flange portion 172c of the inner hub 17. The damper portion 181 includes four projections 1811, which outwardly project in the radial direction of the shaft 20, and each of the vibration suppressor portions 183 is placed between circumferentially adjacent two of the projections 1811. In other words, the damper portion 181 has a plurality of recesses 1812, each of which is recessed radially inwardly on a radially inner side of a circle that is centered at the axis of the shaft 20. Each of the vibration suppressor portions 183 is placed at a corresponding one of the recesses 1812.

A projected shape of the damper portion 181, which is formed by projecting the damper portion 181 onto a plane perpendicular to the axial direction DRax of the shaft 20, is in a crisscross shape (i.e., a shape in a symbol of +). Furthermore, an opening 181c, which is in a crisscross shape (i.e., a shape in a symbol of +), is formed at a center of the damper portion 181.

As shown in FIG. 10, the damper portion 181 is placed between an inner peripheral part of the outer hub 16 and an outer peripheral part of the flange portion 172c of the inner hub 17. Specifically, the damper portion 181 is press fitted between the inner peripheral part of the outer hub 16 and the outer peripheral part of the flange portion 172c of the inner hub 17 such that a compression load is exerted by the damper portion 181 between the inner peripheral part of the outer hub 16 and the outer peripheral part of the inner hub 17 in the rotational direction RD of the shaft 20.

Each of the connecting portions 184 extends from one axial end part of the damper portion 181 in the axial direction DRax of the shaft 20 such that the connecting portion 184 connects between the damper portion 181 and the corresponding vibration suppressor portion 183.

The vibration suppressor portion 183 radially outwardly extends from one axial end part of the connecting portion 184, which is placed at one end in the axial direction DRax, in the radial direction DRr of the shaft 20. An outer peripheral part of the vibration suppressor portion 183 is shaped in a substantially arcuate form.

Figure 11:
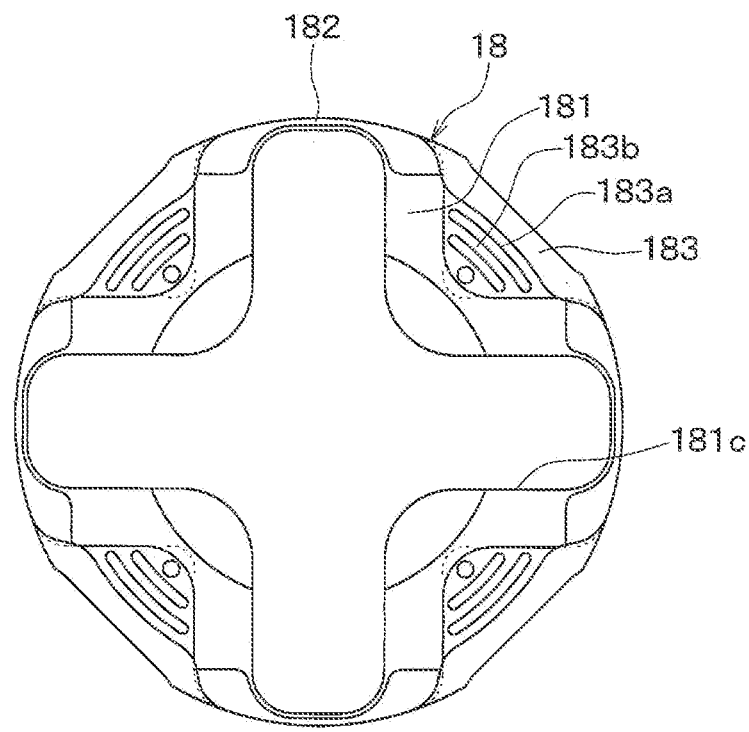
FIG. 11 is a schematic back view of the rubber member.
Figure 12:
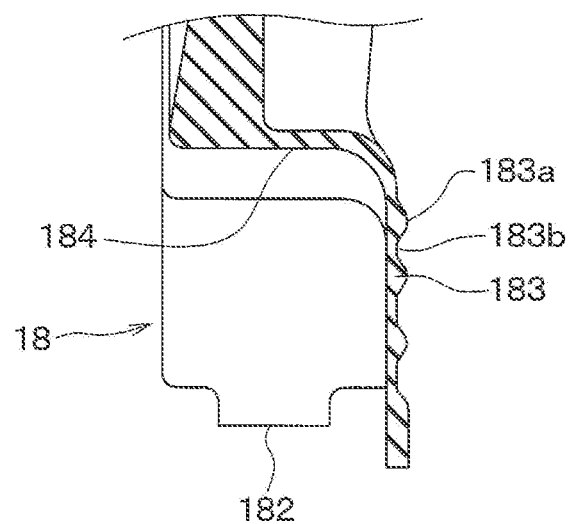
FIG. 12 is a cross-sectional view taken along line XII-XII in FIG. 10.
Figure 13:
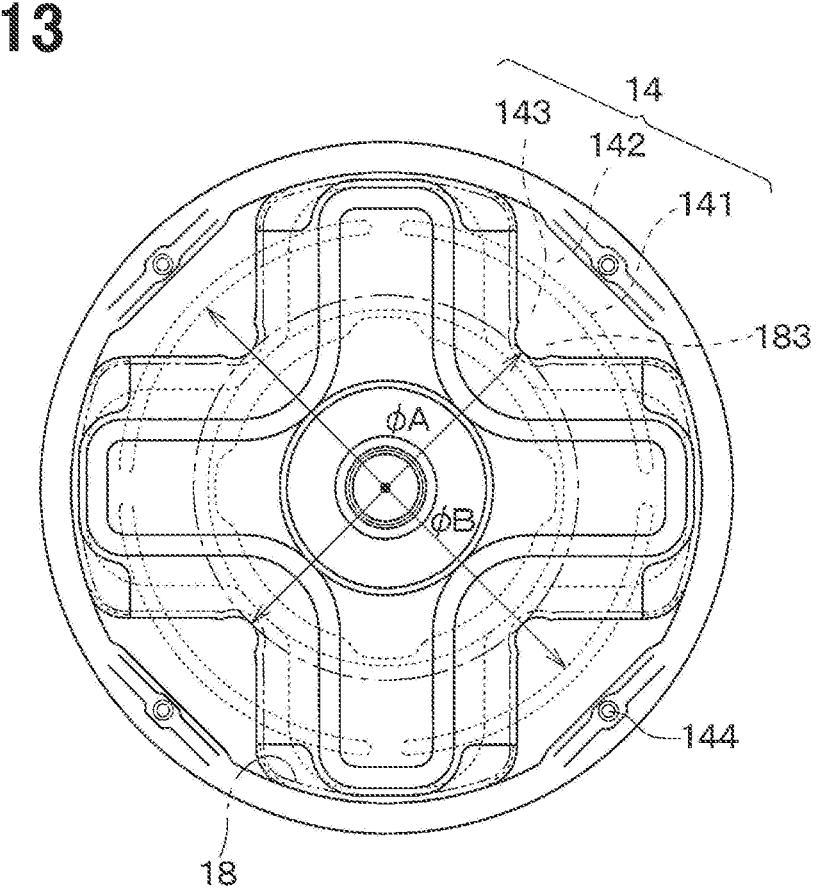
FIG. 13 is a view taken in a direction of an arrow IV in FIG. 2, showing a structure after removal of the outer hub.

As shown in FIGS. 11 and 12, a surface of each vibration suppressor portion 183, which is opposed to the armature 14, has a plurality of protrusions 183a and a plurality of recesses 183b.

Each vibration suppressor portion 183 is clamped between the outer side coupling portion 161 of the outer hub 16 and the armature 14 while the armature 14 has the outer plate 142 and the inner plate 143.

In the state where the vibration suppressor portion 183 is clamped between the outer side coupling portion 161 of the outer hub 16 and the armature 14, the outer plate 142 of the armature 14 is coupled to the outer side coupling portion 161 of the outer hub 16 by the fastening members 144.

In the present embodiment, the rubber member 18 is made of a rubber material that is one of EPDM (ethylene-propylene-diene rubber), NBR (nitrile rubber), H-NBR (hydrogenated nitrile rubber) or CI-IIR (chlorinated butyl rubber). Here, EPDM, NBR and H-NBR are excellent in abrasion resistance, and CI-IIR is excellent in vibration suppression and is also excellent in compatibility (namely, chemical resistance) with a bonding agent.

When the armature 14 is magnetically attracted to and is coupled to the rotor 11, the inner plate 172 transmits the torque, which is transmitted from the rotor 11 through the armature 14, the fastening members 144, the outer hub 16 and the rubber member 18, to the inner hub 17. A contact location between the inner plate 172 and the armature 14 is determined according to an axial position of the shaft 20 at the armature 14.

In the energized state of the electromagnet 12, a predetermined gap is formed between the resin plate 172 and the armature 14. Then, when the electromagnet 12 is deenergized, the resin plate 172 contacts the armature 14 and receives the outer plate 142 of the armature 14.

Furthermore, as shown in FIG. 5, the inner side plate-shaped portion 171 of the present embodiment is placed such that a center of the inner side plate-shaped portion 171 coincides with the rotational axis CL of the rotor 11. The armature 14 includes the outer plate 142 and the inner plate 143, which are concentrically arranged about the rotational axis CL of the rotor 11. A circular opening is formed at a center of the inner plate 143, and the inner plate 143 is placed between the rotor 11 and the inner side plate-shaped portion 171.

The outer hub 16 is fixed to the outer plate 142 such that the outer hub 16 covers the outer peripheral part of the inner side plate-shaped portion 171.

Next, the operation of the power transmission device 10 of the present embodiment will be described. In the case where the electromagnet 12 is in the deenergized state, the magnetic attractive force of the electromagnet 12 is not generated. Therefore, the armature 14 is urged by the rubber member 18 in the direction away from the end surface portion 113 of the rotor 11.

In this way, the rotational drive force of the engine 6 is transmitted to the rotor 11 through the belt 7 but is not transmitted to the armature 14 and the hub 15, so that only the rotor 11 runs idle around the ball bearing 19. Therefore, the compressor 2, which is the drive-subject device, is held in the stop state.

Then, when the electromagnet 12 is placed in the energized state, the magnetic attractive force of the electromagnet 12 is generated. The armature 14 is attracted to the end surface portion 113 of the rotor 11 by the magnetic attractive force, and thereby the armature 14 is coupled to the rotor 11 by the magnetic attractive force.

The outer plate 142 and the inner plate 143 of the armature 14 contact the outer side coupling portion 161 of the outer hub 16 through the vibration suppressor portions 183 of the rubber member 18. Therefore, due to the contact with the vibration suppressor portions 183 discussed above, it is possible to suppress the operational noises, such as the contact noise generated at the time of contacting the armature 14 against the rotor 11 and the resonance noise generated by vibrations (serving as a vibration source) induced at the time of magnetically attracting and coupling the armature 14 to the rotor 11 in the state where the armature 14 is rotated together with the rotor 11.

Furthermore, the armature 14 is magnetically attracted to and is coupled to the rotor 11, and thereby the rotation of the rotor 11 is transmitted to the shaft 20 of the compressor 2 through the driven-side rotatable body 13. Thus, the compressor 2 is driven. Specifically, the rotational drive force, which is outputted from the engine 6, is transmitted to the compressor 2 through the power transmission device 10, and thereby the compressor 2 is driven.

Furthermore, when the electromagnet 12 is in the deenergized state, the magnetic attractive force of the electromagnet 12 is not generated. Therefore, the armature 14 is pulled away from the rotor 11 by the elastic force of the rubber member 18.

The outer plate 142 and the inner plate 143 of the armature 14 contact the outer side coupling portion 161 of the outer hub 16 through the vibration suppressor portions 183 of the rubber member 18. Thus, due to the contact with the vibration suppressor portions 183 discussed above, it is possible to suppress the operational noise that is generated at the time of pulling the armature 14 away from the rotor 11.

As discussed above, the power transmission device of the present embodiment is configured to transmit the rotational drive force outputted from the drive source 6 to the drive-subject device 2 and includes: the electromagnet 12 that is configured to generate the magnetic attractive force when the electromagnet 12 is energized; and the rotor 11 that is configured to be rotated about the rotational axis CL by the rotational drive force. The power transmission device of the present embodiment further includes: the armature 14 that is configured to be coupled to and is rotated together with the rotor 11 when the electromagnet 12 is energized, wherein the armature 14 is configured to be decoupled from the rotor 11 when the electromagnet 12 is deenergized; and the hub 15 that couples the armature 14 to the shaft of the drive-subject device 2.

The armature 14 includes the grooves 141 that extend in the circumferential direction about the rotational axis CL. The armature 14 includes the inner plate 143, which is located on the inner side of the grooves 141, and the outer plate 142, which is located on the outer side of the grooves 141. The hub 15 includes: the outer hub 16; the inner hub 17 that is coupled to the shaft 20; and the damper portion 181 that is interposed between the inner hub 17 and the outer hub 16 and is configured to exert the elastic force to the outer hub 16 in the direction away from the rotor 11. The outer hub 16 includes the outer side coupling portion 161 that is opposed to the outer plate 142 and the inner plate 143 and is coupled to the outer plate 142. The hub 15 includes the secondary elastic members 183, each of which is clamped between: the outer plate 142 and the inner plate 143 located on one side of the secondary elastic member 183; and the outer side coupling portion 161 located on the other side of the secondary elastic member 183.

With the above configuration, the outer hub 16 includes the outer side coupling portion 161 that is opposed to the outer plate 142 and the inner plate 143 and is coupled to the outer plate 142. The hub 15 includes the vibration suppressor portions 183, each of which is clamped between: the outer plate 142 and the inner plate 143 located on the one side of the vibration suppressor portion 183; and the outer side coupling portion 161 located on the other side of the vibration suppressor portion 183. Thus, when the electromagnet 12 is energized, the vibration of the outer plate 142 and the inner plate 143 is suppressed by the secondary elastic members 183, each of which is clamped between: the outer plate 142 and the inner plate 143 located on the one side of the secondary elastic member 183; and the outer side coupling portion 161 located on the other side of the secondary elastic member 183. Thus, the operational noise, which is generated at the time of energizing the electromagnet, can be limited.

Each vibration suppressor portion 183 is shaped in the plate form, and the protrusions 183a and the recesses 183b are formed at the surface of the vibration suppressor portion 183, which is opposed to the armature 14. The vibration suppressor portion 183 is clamped in a compressed state between: the outer plate 142 and the inner plate 143 located on the one side of the vibration suppressor portion 183; and the outer side coupling portion 161 located on the other side of the vibration suppressor portion 183.

Therefore, it is possible to absorb a variation in the thickness of the vibration suppressor portion 183, which is in the compressed state, at the time of coupling the outer plate 142 to the outer hub 16 with the fastening members 144, such as the rivets. Furthermore, since the surface of the vibration suppressor portion 183, which is opposed to the armature 14, has the protrusions 183a and the recesses 183b, it is possible to ensure a sufficient tightening margin.

Furthermore, the vibration suppressor portions 183 are formed integrally with the damper portion 181 in one piece. Thus, in comparison to the case where the vibration suppressor portions 183 and the damper portion 181 are formed separately, it is possible to reduce the number of the components. Furthermore, the assembling work can be eased, and the manufacturing costs can be reduced.

Furthermore, the damper portion 181 includes the plurality of projections 1811, which outwardly project in the radial direction of the shaft 20, and each of the vibration suppressor portions 183 is placed between the corresponding adjacent two of the projections 1811.

As discussed above, the damper portion 181 may include the plurality of projections 1811, which outwardly project in the radial direction of the shaft 20, and each of the vibration suppressor portions 183 may be placed between the corresponding adjacent two of the projections 1811.

Furthermore, the damper portion 181 has the recesses 1812, each of which is radially inwardly recessed from the circle that is centered at the axis of the shaft 20, and each of the vibration suppressor portions 183 is placed at the corresponding one of the recesses 1812.

As discussed above, the damper portion 181 may have the recesses 1812, each of which is radially inwardly recessed from the circle that is centered at the axis of the shaft 20, and each of the vibration suppressor portions 183 may be placed at the corresponding one of the recesses 1812.

Second Embodiment

Figure 14:
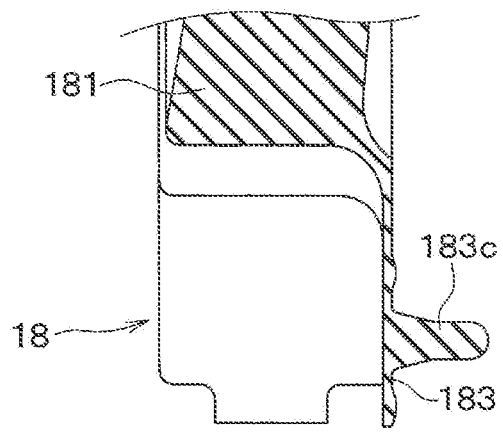
FIG. 14 is a cross-sectional view of a rubber member of a second embodiment, corresponding to an area IX in FIG. 5.
Figure 15:
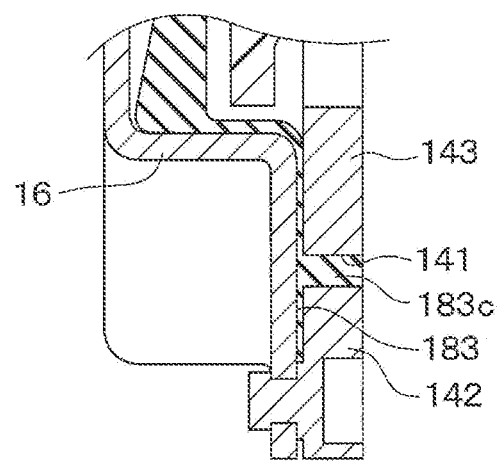
FIG. 15 is a cross-sectional view of the rubber member of the second embodiment, corresponding to the cross-sectional view taken along line XII-XII in FIG. 10.

A second embodiment will be described with reference to FIGS. 14 and 15. In the power transmission device of the present embodiment, as shown in FIG. 14, a projecting part 183c is formed at one of the two opposed surface of each vibration suppressor portion 183 of the rubber member 18. As shown in FIG. 15, the projecting part 183c is inserted into the corresponding groove 141 formed at the armature 14.

One surface of the projecting part 183c contacts both of the outer plate 142, which is located on the outer side of the grooves 141, and the inner plate 143, which is located on the inner side of the grooves 141. The other surface of the projecting part 183c contacts the outer side coupling portion 161.

As discussed above, each vibration suppressor portion 183 includes the projecting part 183c that projects toward the one surface side and is inserted in the corresponding groove 141 formed at the armature 14. Therefore, the operational noise, which is generated at the time of coupling the outer plate 142 to the outer hub 16 with the fastening members 144, such as the rivets, can be reduced.

Third Embodiment

Figure 16:
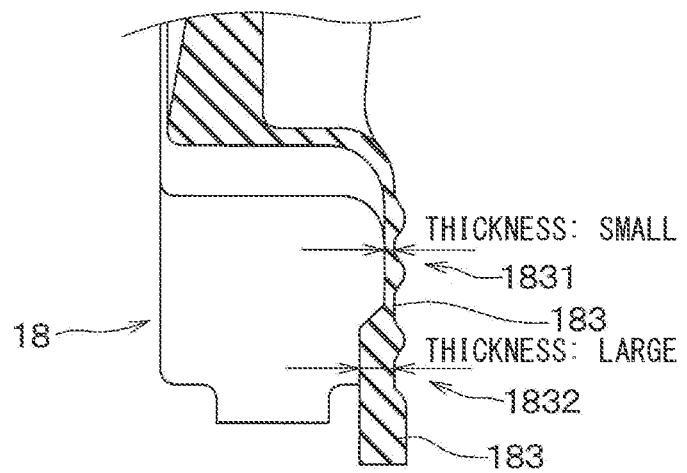
FIG. 16 is a cross-sectional view of a rubber member of a third embodiment, corresponding to the cross-sectional view taken along line XII-XII in FIG. 10.

A third embodiment will be described with reference to FIG. 16. Each vibration suppressor portion 183 of the rubber member 18 of the present embodiment includes a first region 1831, which has a first thickness, and a second region 1832, which has a second thickness that is larger than the first thickness. Furthermore, a surface of the first region 1831 and a surface of the second region 1832, which are opposed to the armature 14, have protrusions and recesses.

As described above, the vibration suppressor portion 183 may have the first region 1831, which has the first thickness, and the second region 1832, which has the second thickness that is larger than the first thickness.

Fourth Embodiment

Figure 17:
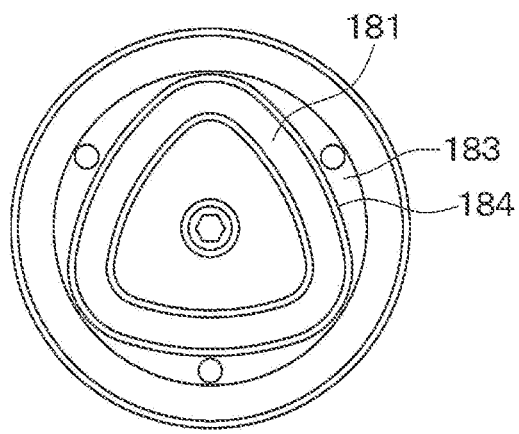
FIG. 17 is a front view of a rubber member of a fourth embodiment.

A fourth embodiment will be described with reference to FIG. 17. The damper portion 181 of the rubber member 18 of the present embodiment is configured such that a projected shape of the damper portion 181, which is formed by projecting the damper portion 181 onto a plane perpendicular to the axial direction DRax of the shaft 20, is in a form of a rounded triangle. The rounded triangle is a triangle that has round corners.

As described above, the damper portion 181 may be configured such that the projected shape of the damper portion 181, which is formed by projecting the damper portion 181 onto the plane perpendicular to the axial direction of the shaft 20, is in the form of the rounded triangle.

Here, it should be noted that although the projected shape of the damper portion 181, which is formed by projecting the damper portion 181 onto the plane perpendicular to the axial direction DRax of the shaft 20, is in the form of the rounded triangle in the present embodiment, the projected shape of the damper portion 181 may be in a form of another rounded polygon, such as a rounded hexagon.

Furthermore, the projected shape of the damper portion 181, which is formed by projecting the damper portion 181 onto the plane perpendicular to the axial direction DRax of the shaft 20, may be in a form of a polygon.

Fifth Embodiment

Figure 18:
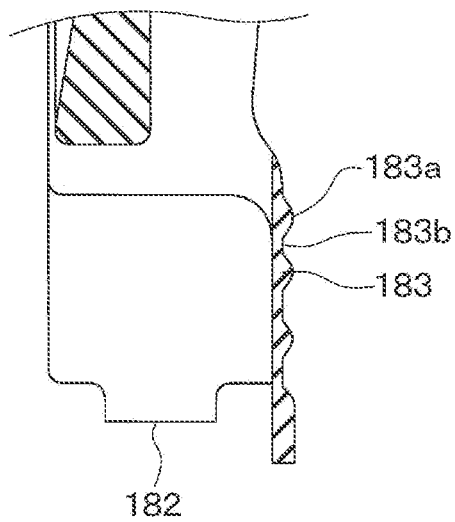
FIG. 18 is a cross-sectional view of a rubber member of a fifth embodiment, corresponding to the cross-sectional view taken along line XII-XII in FIG. 10.

A fifth embodiment will be described with reference to FIG. 18. In the present embodiment, the damper portion 181 and the peripheral portions 182 are formed integrally in one piece, and the vibration suppressor portions 183 are formed separately from the damper portion 181 and the peripheral portions 182. Specifically, the damper portion 181 and the peripheral portions 182 are formed separately from the vibration suppressor portions 183.

Furthermore, a material of the damper portion 181 and the peripheral portions 182 is different from a material of the vibration suppressor portions 183. Specifically, the damper portion 181 and the peripheral portions 182 are made of a rubber material, which is one of EPDM, NBR and H-NBR that are excellent in abrasion resistance, and the vibration suppressor portion 183 is made of a rubber material, such as CI-IIR that is excellent in vibration suppression.

As described above, the damper portion 181 and the vibration suppressor portions 183 may be formed separately from each other, and the material of the damper portion 181 and the material of the vibration suppressor portions 183 may be different from each other. For example, the damper portion 181 may be made of the rubber material, which is excellent in the abrasion resistance, and the vibration suppressor portions 183 may be made of the rubber material that is excellent in the vibration suppression. In this way, it is possible to achieve both of the abrasion resistance and the vibration suppression.

Other Embodiments (1) In each of the above embodiments, the protrusions 183a and the recesses 183b are formed at the surface of each vibration suppressor portion 183, which is opposed to the armature 14. Alternatively, the protrusions 183a and the recesses 183b may be formed at an opposite surface of the vibration suppressor portion 183 that is opposite from the surface of the vibration suppressor portion 183, which is opposed to the armature 14.

(2) In the fifth embodiment, the damper portion 181 and the peripheral portions 182 are formed separately from the vibration suppressor portions 183, and the material of the damper portion 181 and the peripheral portions 182 is different from the material of the vibration suppressor portions 183. Alternatively, the damper portion 181 and the peripheral portions 182 may be formed integrally with the vibration suppressor portions 183 in one piece while the material of the damper portion 181 and the peripheral portions 182 is different from the material of the vibration suppressor portions 183.

The present disclosure should not be limited to the above embodiments, and the above embodiments may be modified in various appropriate ways. The above embodiments are not necessarily unrelated to each other and can be combined in any appropriate combination unless such a combination is obviously impossible. The constituent component(s) of each of the above embodiments is/are not necessarily essential unless it is specifically stated that the constituent component(s) is/are essential in the above embodiment, or unless the component(s) is/are obviously essential in principle. In each of the embodiments described above, when a specific numerical value(s) such as a number, a numerical value, an amount or a range, of any of the constituent elements of the respective embodiments is mentioned, the present disclosure should not be limited to the specific numerical value(s) unless it is clearly stated that the specific numerical value(s) is essential, or the specific numerical value(s) is obviously essential in principle. In each of the embodiments described above, when a material, a shape, a positional relationship or the like of the respective constituent elements is mentioned, it should not be limited to the material, the shape, the positional relationship or the like of the respective constituent elements unless it is clearly stated that the material, the shape, the positional relationship or the like of the respective constituent element(s) is essential, or the material, the shape, the positional relationship or the like of the respective constituent element(s) is obviously essential in principle.

Conclusion

According to a first aspect, which is indicated by one or more or all of the embodiments described above, there is provided the power transmission device configured to transmit the rotational drive force, which is outputted from the drive source, to the drive-subject device. The power transmission device includes the electromagnet that is configured to generate the magnetic attractive force when the electromagnet is energized. Furthermore, the power transmission device includes: the rotor that is configured to be rotated about the rotational axis by the rotational drive force; and the armature that is configured to be coupled to and is rotated together with the rotor when the electromagnet is energized, wherein the armature is configured to be decoupled from the rotor when the electromagnet is deenergized. Furthermore, the power transmission device includes the hub that couples the armature to the shaft of the drive-subject device. Furthermore, the armature has the groove that extends in the circumferential direction about the rotational axis. The armature includes the inner plate, which is located on the inner side of the groove, and the outer plate, which is located on the outer side of the groove. The hub includes: the outer hub; the inner hub that is coupled to the shaft; and the primary elastic member that is interposed between the inner hub and the outer hub and is configured to exert the elastic force to the outer hub in the direction away from the rotor. The outer hub includes the outer side coupling portion that is opposed to the outer plate and the inner plate and is coupled to the outer plate. The hub includes the secondary elastic member that is clamped between: the outer plate and the inner plate located on the one side of the secondary elastic member; and the outer side coupling portion located on the other side of the secondary elastic member.

Furthermore, according to a second aspect, the secondary elastic member is shaped in the plate form, and at least one of the opposed surfaces of the secondary elastic member, which are opposed to each other, has the protrusion and the recess, and the secondary elastic member is clamped in the compressed state between: the outer plate and the inner plate located on the one side of the secondary elastic member; and the outer side coupling portion located on the other side of the secondary elastic member.

As described above, at least one of the opposed surfaces of the secondary elastic member has the protrusion and the recess, and the secondary elastic member is clamped in the compressed state between: the outer plate and the inner plate located on the one side of the secondary elastic member; and the outer side coupling portion located on the other side of the secondary elastic member.

Therefore, it is possible to absorb the variation in the thickness of the secondary elastic member, which is in the compressed state, at the time of coupling the outer plate to the outer hub with the fastening members, such as the rivets. Furthermore, since at least one of the opposed surfaces of the secondary elastic member, which are opposed to each other, has the protrusion and the recess, it is possible to ensure the sufficient tightening margin.

Furthermore, according to a third aspect, the secondary elastic member is formed integrally with the primary elastic member in one piece. Thus, in comparison to the case where the secondary elastic member and the primary elastic member are formed separately, it is possible to reduce the number of the components. Furthermore, the assembling work can be eased, and the manufacturing costs can be reduced.

Furthermore, according to a fourth aspect, the secondary elastic member is formed separately from the primary elastic member. As described above, the secondary elastic member may be formed separately from the primary elastic member.

Furthermore, according to a fifth aspect, the material of the secondary elastic member differs from the material of the primary elastic member. For example, the primary elastic member may be made of the rubber material, which is excellent in the abrasion resistance, and the secondary elastic member may be made of the rubber material, which is excellent in the vibration suppression. In this way, it is possible to achieve both of the abrasion resistance and the vibration suppression.

Furthermore, according to a sixth aspect, the secondary elastic member includes the projecting part that projects from the one of the opposed surfaces of the secondary elastic member; and the projecting part is inserted into the groove. Therefore, the operational noise, which is generated at the time of coupling the outer plate 142 to the outer hub 16, can be reduced.

Furthermore, according to a seventh aspect, the secondary elastic member includes: the first region that has the first thickness; and the second region that has the second thickness, which is larger than the first thickness. As described above, the secondary elastic member may have the first region, which has the first thickness, and the second region, which has the second thickness that is larger than the first thickness.

Furthermore, according to an eighth aspect, the primary elastic member includes the plurality of projecting portions that outwardly project in the radial direction of the shaft, and the secondary elastic member is placed between the adjacent two of the plurality of projections.

As described above, the primary elastic member may include the plurality of projections that outwardly project in the radial direction of the shaft, and the secondary elastic member may be placed between the adjacent two of the plurality of projections.

Furthermore, according to a ninth aspect, the primary elastic member includes the recess that is recessed radially inwardly on the radially inner side of the circle, which is centered at the axis of the shaft, and the secondary elastic member is placed at the recess.

As discussed above, the primary elastic member may include the recess that is recessed radially inwardly on the radially inner side of the circle that is centered at the axis of the shaft, and the secondary elastic member may be placed at the recess.

According to a tenth aspect, the primary elastic member is configured such that the projected shape of the primary elastic member, which is formed by projecting the primary elastic member onto the plane perpendicular to the axial direction of the shaft 20, is in the form of the polygon or the rounded polygon. As described above, the primary elastic member may be configured such that the projected shape of the primary elastic member, which is formed by projecting the primary elastic member onto the plane perpendicular to the axial direction of the shaft 20, is in the form of the polygon or the rounded polygon.

What is claimed is:

1. A power transmission device configured to transmit a rotational drive force, which is outputted from a drive source, to a drive-subject device, comprising:
    an electromagnet that is configured to generate a magnetic attractive force when the electromagnet is energized;
    a rotor that is configured to be rotated about a rotational axis by the rotational drive force;
    an armature that is configured to be coupled to and is rotated together with the rotor when the electromagnet is energized, wherein the armature is configured to be decoupled from the rotor when the electromagnet is deenergized; and
    a hub that couples the armature to a shaft of the drive-subject device, wherein:
    the armature has a groove that extends in a circumferential direction about the rotational axis;
    the armature includes an inner plate, which is located on an inner side of the groove, and an outer plate, which is located on an outer side of the groove;
    the hub includes:
      an outer hub;
      an inner hub that is coupled to the shaft; and
      a primary elastic member that is interposed between the inner hub and the outer hub and is configured to exert an elastic force to the outer hub in a direction away from the rotor;
    the outer hub includes an outer side coupling portion that is opposed to both of the outer plate and the inner plate in an axial direction of the shaft and is coupled to the outer plate;
    the hub includes a secondary elastic member, a portion of which is clamped in a compressed state between the outer plate and the outer side coupling portion in the axial direction, and another portion of which is clamped in a compressed state between the inner plate and the outer side coupling portion in the axial direction, the portion and the another portion being continuous with each other; and the outer side coupling portion is fastened to the outer plate by a fastener to compress the secondary elastic member in the axial direction.

2. The power transmission device according to claim 1, wherein:

the secondary elastic member is shaped in a plate form;

at least one of opposed surfaces of the secondary elastic member, which are opposed to each other, has a protrusion and a recess; and the secondary elastic member is clamped in a compressed state between:

the outer plate and the inner plate both located on the one side of the secondary elastic member; and the outer side coupling portion located on the other side of the secondary elastic member.

3. The power transmission device according to claim 1, wherein the secondary elastic member is formed integrally with the primary elastic member in one piece.

4. The power transmission device according to claim 1, wherein the secondary elastic member is formed separately from the primary elastic member.

5. The power transmission device according to claim 1, wherein a material of the secondary elastic member differs from a material of the primary elastic member.

6. The power transmission device according to claim 1, wherein:

the secondary elastic member includes a projecting part that projects from one of opposed surfaces of the secondary elastic member, which are opposed to each other; and the projecting part is inserted into the groove.

7. The power transmission device according to claim 1, wherein the secondary elastic member includes:

a first region that has a first thickness; and a second region that has a second thickness, which is larger than the first thickness.

8. The power transmission device according to claim 1, wherein:

the primary elastic member includes a plurality of projections that outwardly project in a radial direction of the shaft; and the secondary elastic member is placed between adjacent two of the plurality of projections.

9. The power transmission device according to claim 1, wherein:

the primary elastic member has a recess that is recessed radially inwardly on a radially inner side of a circle that is centered at an axis of the shaft; and the secondary elastic member is placed at the recess.

10. The power transmission device according to claim 1, wherein the primary elastic member is configured such that a projected shape of the primary elastic member, which is formed by projecting the primary elastic member onto a plane perpendicular to the axial direction of the shaft, is in a form of a polygon or a rounded polygon.

* * * * *